Jan. 16, 1940.                J. V. PAGLIARONI                2,187,281
                              AUTOMOBILE HEATER
                              Filed Jan. 18, 1937
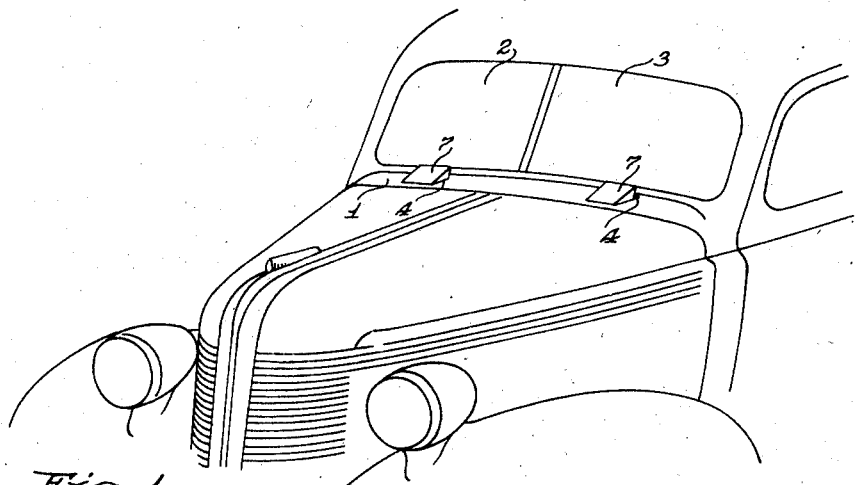
Fig. 1.
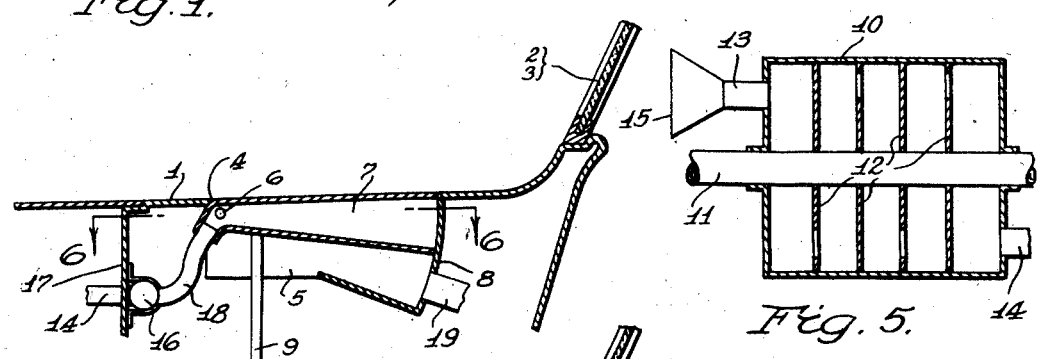
Fig. 2.                                            Fig. 5.
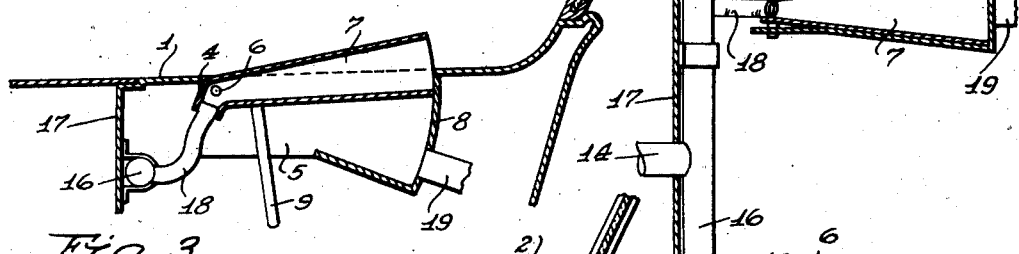
Fig. 3.
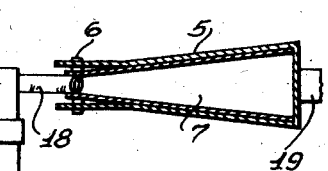
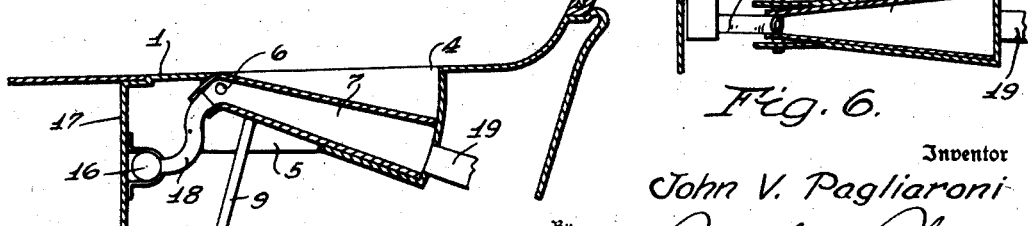
Fig. 4.                                            Fig. 6.
Inventor
John V. Pagliaroni
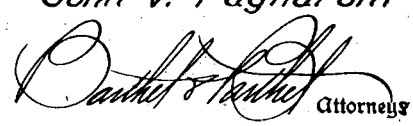
Attorneys Patented Jan. 16, 1940

2,187,281

UNITED STATES PATENT OFFICE 2,187,281

AUTOMOBILE HEATER

John V. Pagliaroni, Clawson, Mich., assignor of one-third to Mildred A. Hund, Grosse Pointe Park, Mich., and one-third to Howard R. Roberts, Westchester, Ill.

Application January 18, 1937, Serial No. 121,062

4 Claims. (Cl. 20—40.5)

The present invention relates to heaters for automobiles and has as a primary object to provide a heater which may be operated to supply heated air to the passenger compartment of a vehicle and also to direct a stream of heated air against the outside surface of the windshield to prevent the formation of ice thereon.

Another object of the invention is to provide apparatus in the cowl of an automobile body for receiving heated air from a heater, such as an exhaust pipe heater, the said apparatus including two outlet devices individually movable to three alternative positions. In one position of the outlet devices heated air is directed against the windshield, in the second position the flow of heated air is stopped off completely, and in the third position the heated air is directed to the passenger compartment of the automobile.

With the above and other ends in view the invention is more fully disclosed with reference to the accompanying drawing, in which:

Figure 1 is a fragmental perspective of an automobile, illustrating the location of the outlet devices;

Figs. 2, 3 and 4 are vertical sections illustrating different operative stages;

Fig. 5 is a section of a heater, and

Fig. 6 is a section taken on the line 6—6 of Fig. 2.

Like characters of reference are employed throughout to designate corresponding parts.

The numeral 1 designates the cowl of an automobile. In the cowl, adjacent each of the two windshield sections 2 and 3, is provided an opening 4, and secured to the inner surface of the cowl beneath each opening is a housing 5. Pivoted at 6 in each housing 5 is a funnel-like outlet member 7. The housing 5 has a curved wall 8, the center of curvature of which coincides with the pivotal support 6 of the receptive outlet member. The outlet end, or in other words, the swinging end of the outlet member 7 slides against the curved wall 8 so that when the outlet member is placed in the position shown in Fig. 2 the wall 8 closes the outlet end thereof and prevents the passage of air therethrough. The two outlet members 8 thus provided each have an operating handle 9 by means of which it may be moved manually to any of the three positions shown in Figs. 2, 3 and 4 respectively.

An air heater is shown in Fig. 5 wherein the numeral 10 designates a casing mounted upon the exhaust pipe 11. In the casing 10 are a plurality of baffles 12 which force air entering the inlet 13 to follow a circuitous path before it passes out the outlet pipe 14. As shown, the air inlet 13 has an enlarged, funnel-like mouth 15 for collecting air from the air stream created by the cooling fan of the engine of the automobile.

Air entering the casing 10 is heated by contact with the exhaust pipe 11 and the baffles 12 and is delivered through the outlet pipe 14 to a manifold 16 supported by a vertical wall 17 adjacent the housings 5. A flexible conduit 18 is connected to each end of the manifold 16 and the two conduits extend to adjacent outlet members 7.

The two outlet members 7 may be moved individually to three alternative positions. For example, they may be moved to the position shown in Fig. 2 wherein the outlet end is closed by the wall 8 and wherein the flow of heated air is prevented. They may also be moved to the position shown in Fig. 3 wherein the heated air delivered to the outlet members from the manifold is discharged against the windshield section 3 or 4, as the case may be, or they may be moved to the position shown in Fig. 4 where the outlet end of the outlet members register with conduits 19 in the curved walls 8 respectively. The conduits 19 deliver the heated air to the passenger compartment of the automobile.

It is apparent that the two outlet members are individually operable, with the result that either one may be set to a position delivering heated air against a windshield section while the other is inoperative or in a position delivering heated air to the interior of the automobile.

Although a specific embodiment of the invention has been illustrated and described it will be understood that various changes may be made within the scope of the appended claims without departing from the spirit of the invention, and such changes are contemplated.

What I claim is:

1. A heated air distributor for an automobile having a windshield, a cowl with an opening therein adjacent the windshield and a passenger compartment, said distributor comprising a housing adapted to be mounted on said cowl beneath the opening therein, an outlet member pivotally mounted in said housing, said outlet member being adapted to receive heated air, said housing having a wall adapted to close the outlet end of said outlet member and an outlet leading to said passenger compartment, and means for moving said outlet member to selective positions wherein said wall closes the outlet end thereof, wherein the outlet end thereof registers with said housing outlet, and wherein the outlet end projects through said cowl opening to direct heated air against said windshield.

2. In a motor vehicle having a windshield and having a cowl and a passenger compartment, an opening to outside atmosphere in the cowl adjacent the windshield, a housing within the cowl beneath said opening, a hollow air deflector member in said housing and having a wall thereof to position in and close said opening, said deflector member having a passage therethrough for air and having an outlet closable by a wall of said housing, an outlet for said housing for flow of air into the passenger compartment and registerable with said deflector member outlet, said deflector member being movable to a position to deflect air against the outer surface of the windshield and also being movable to a position to register its outlet with said housing outlet.

3. In a motor vehicle having a windshield and having a cowl and a passenger compartment, an opening to outside atmosphere in the cowl adjacent the windshield, a housing within the cowl beneath said opening, a hollow air deflector member in said housing having a lower wall and a top wall to position in and close said opening, said deflector member having a passage therethrough formed in part by said walls for flow of air and having an outlet closable by a wall of said housing, an outlet for said housing for flow of air into the passenger compartment and registerable with said deflector member outlet, said deflector member being movable to a position to deflect air against the outer surface of the windshield and also being movable to a position to register its outlet with said housing outlet, and conduit means connecting a heated air source and the passage of said deflector member.

4. In a motor vehicle having a windshield and a passenger compartment and having a cowl provided with an opening to outside atmosphere adjacent the windshield, a housing beneath said opening within the cowl and having an opening for passage of air into the passenger compartment, a movable closure member having an intermediate position for closing said first-named opening and having an air passage therethrough provided with a forwardly facing air inlet and a rearwardly facing air outlet, means connecting said inlet to a source of heated air, said closure member being arranged for movement out of said housing above the cowl to direct heated air toward the vehicle and being arranged to move downwardly below the cowl to direct heated air into the opening for the passenger compartment, and means for moving said closure member.

JOHN V. PAGLIARONI.